United States Patent Office 3,106,382
Patented Oct. 8, 1963

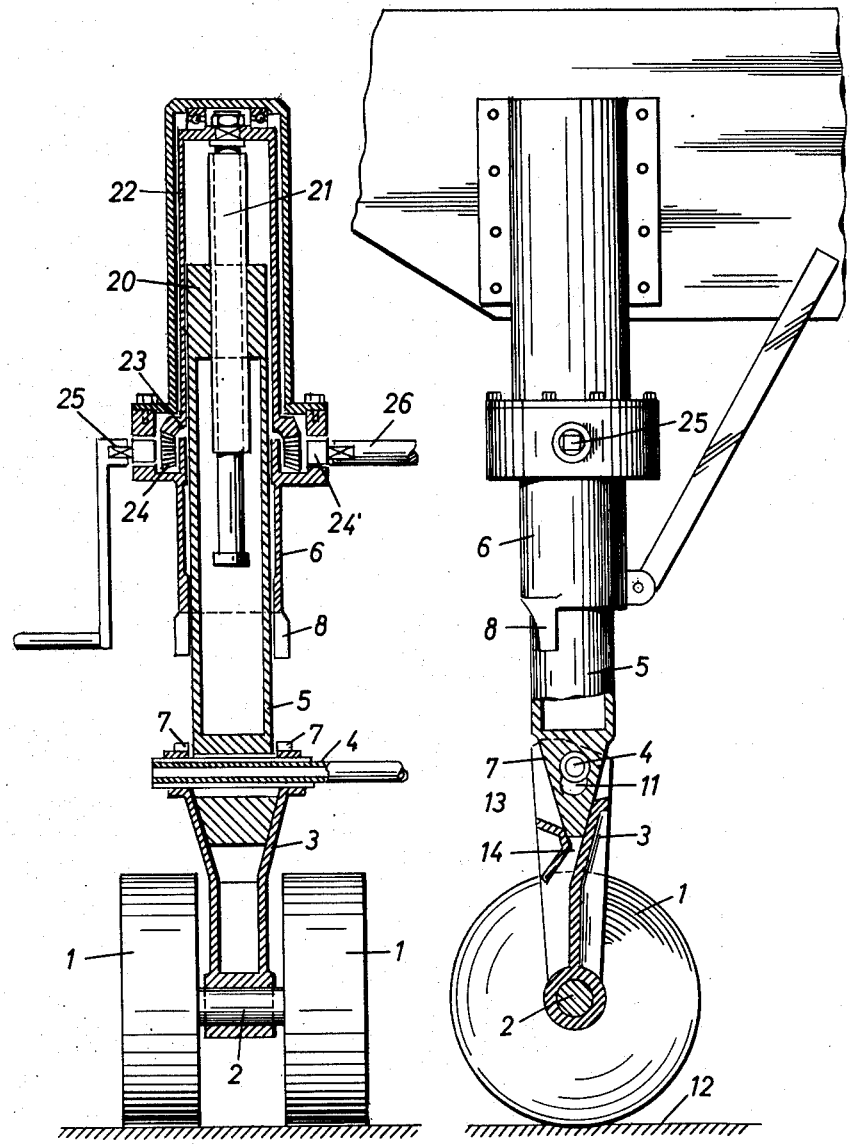

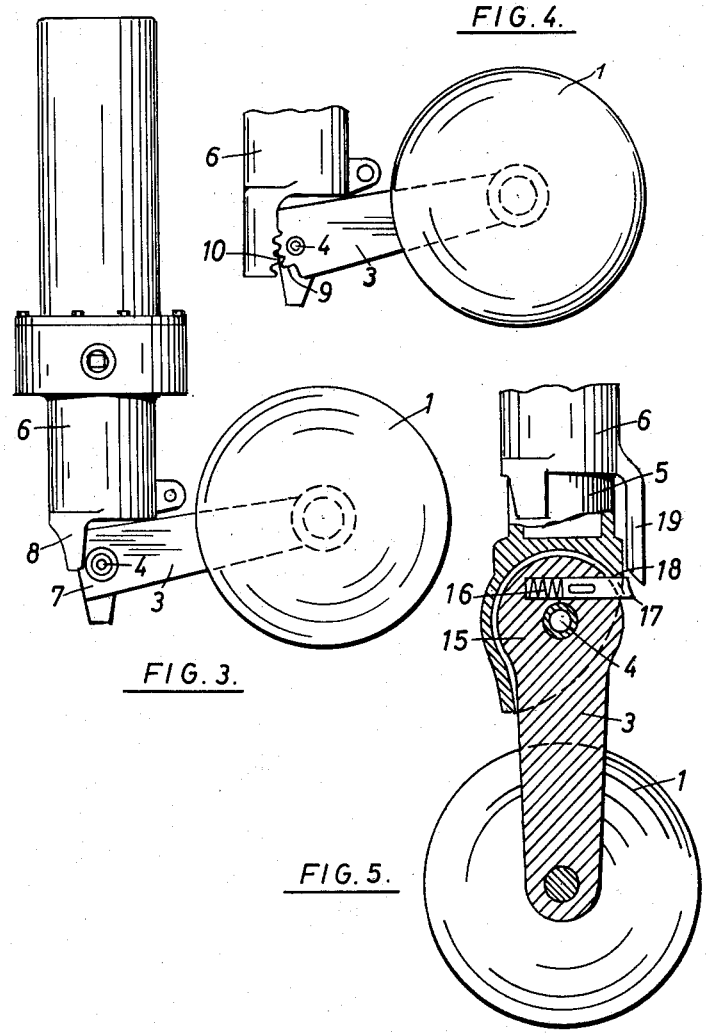

3,106,382
RETRACTABLE VEHICLE SUPPORT
Theodor Georgi, Frankfurt am Main, Germany, assignor to Fifth Wheel Ltd., Zug, Switzerland
Filed Sept. 26, 1961, Ser. No. 140,934
Claims priority, application Germany Sept. 26, 1960
12 Claims. (Cl. 254—86)

This invention relates to vehicles equipped with retractable supports, and particularly to a support arrangement for a low-bed vehicle and the like.

Low-bed trailers and similar vehicles are commonly built in such a manner that the low bed frame rests directly on the ground for convenient loading and unloading of the vehicle. Where the vehicle is towed by a trailer, means must be provided for raising the vehicle from the loading position so that it can be coupled to the trailer by a fifth wheel arrangement. A hinged landing gear of the type conventional in semi-trailers cannot be employed. It is customary therefore to equip low-bed trailers and similar vehicles with a support arrangement in which wheels corresponding to the landing wheels of a semi-trailer are mounted on telescoping legs which may be retracted and extended by a jack, usually a screw jack.

It is desirable to withdraw the wheels of the support arrangement for such a vehicle a substantial distance from the traffic surface over which the vehicle is to travel to provide adequate clearance under the vehicle for movement over rough terrain. The jack of the conventional support arrangements therefore should have ample stroke length. A jack of adequate stroke is bulky and projects above the top surface of the trailer frame in a manner which sometimes seriously interferes with the operation of the vehicle.

When the stroke of the jack is reduced to keep the top of the vehicle unencumbered, the wheels remain quite close to the traffic surface and the vehicle is limited in its applicability. When a jack of adequate stroke can be accommodated on the vehicle, the long stroke makes manual adjustment of the support arrangement between the operative and the retracted positions tedious and labor consuming, particularly when an otherwise desirable screw jack is employed.

The object of this invention is the provision of a support arrangement for a vehicle of the afore-described type which requires a minimum of space, yet combines adequate clearance under the wheels of the support arrangement with rapid and easy operation.

With this object in view, the support arrangement of the invention essentially consists of a support fixed on the vehicle frame, and of a longitudinally divided leg mounted on the support. The upper leg portion is vertically movable on the support, and the lower leg portion is pivoted to the upper leg portion about a horizontal axis. The support and the lower leg portion carry cooperating stops which are horizontally spaced from the pivoting axis of the leg portions. A screw jack is provided to actuate the vertical movement of the upper leg portion. When during vertically upward movement of the upper leg portion, that is, during the retracting movement of the upper leg portion, the stops on the support and the lower leg portion are engaged, further retracting movement of the upper leg portion causes the lower leg portion to pivot about its axis, thus increasing the road clearance of the wheel which is attached to the lower leg portion.

Other features and many of the attendant advantages of this invention will become apparent from the following detailed description of preferred embodiments of the invention when taken in conjunction with the attached drawing in which:

FIG. 1 is a front elevational sectional view of a first embodiment of a support arrangement of the invention;

FIG. 2 shows a portion of a low bed trailer equipped with the support arrangement of FIG. 1, the view being in side elevation with a portion of the support arrangement broken away to reveal internal structure;

FIG. 3 shows a portion of the apparatus of FIG. 2 in a different operational position;

FIG. 4 illustrates a modification of the device of FIG. 3; and

FIG. 5 shows another support arrangement of the invention in a partial view of a low-bed trailer corresponding to that of FIG. 2.

Referring now to the drawing in detail, and initially to FIGS. 1 to 2, there is shown the frame 29 of a low-bed trailer not otherwise illustrated. A tubular support member 6 of rectangular cross section is mounted on the frame 29 by means of a flange connection 30 and an obliquely inclined brace 31 attached to a lug 32 on the member 6. The support member 6 is approximately vertically elongated.

The upper portion 5 of a supporting leg is telescopically received in the support member 6. The lower leg portion 3 is mounted on the upper leg portion 5 by means of a heavy pin 4 and carries two wheels 1 on a common axle 2. The upper leg portion 5 is also of rectangular cross section and thereby secured against rotation in the support member 6.

While only one support arrangement has been illustrated, it will be understood that the trailer frame 29 carries a second identical arrangement spacedly juxtaposed to the one illustrated. The pin 4 extends over the width of the trailer frame and is common to both support arrangements which operate in unison as will be further described hereinbelow.

The lower leg portion 3 has two exposed generally horizontal contact faces 7 of irregular contour which in the position of the support arrangement shown in FIGS. 1 and 2 are partially vertically aligned with cooperating bosses 8 at the lower edge of the fixed support member 6. As best seen from FIG. 2, the aligned portions of the faces 7 are horizontally spaced in the direction of vehicle movement from the axis of the pin 4.

The axis of the pin 4 is fixed relative to the lower leg portion 3, but the pin 4 is slidable over a short distance in a vertically elongated horizontal bore 11 of the upper leg portion 5. The lower terminal portion 13 of the leg portion 5 has the approximate shape of an inverted four-sided pyramid, and wall elements of the lower leg portion 3 define a recess which conforms to the terminal portion 13. In the extended position of the support arrangement illustrated in FIGS. 1 and 2, in which the wheels 1 rest on the underlying traffic surface 12 and carry the weight of the trailer, the terminal portion 13 of the upper leg portion 5 is firmly wedged in the recess 14 of the lower leg portion 3 and thereby locks the two leg portions against angular displacement.

The mechanism for retracting the leg 3, 5 is largely housed within the central cavity of the tubular support member 6. The upper leg portion 5 has an integral internally threaded top portion 20 which is in threaded engagement with a spindle 21. The spindle is fixedly and coaxially fastened to a cylindrical torsion tube 22 the top of which abuts against the closed top of the support member 6 from the inside. A ball bearing 28 is interposed between the torsion tube and the top portion 20 to facilitate rotation of the tube 22. The lower edge of the tube 22 carries a bevel gear rim 23 coaxial with the tube, the spindle 21, the support member 6, and the leg portion 5. The bevel gear rim 23 meshes with two bevel gears 24 and 24' which are mounted on respective horizontal shafts 25 and 26. The shaft 25 carries a crank handle 27 by means of which the shaft 25 may be turned. The shaft 26 is common to both support arrangements of the low-bed trailer and transmits the movement of the crank handle 27 to the other support arrangement for corresponding movement.

The afore-described apparatus operates as follows:

When the handle 27 is turned, the torsion tube 22 of the support arrangement illustrated and the corresponding tube of the non-illustrated other arrangement rotate in unison. Since the second support arrangement operates in exactly the same manner as the one shown in the drawing, the further description will be limited to the latter, it being understood that the corresponding movements of both arrangements occur simultaneously.

Because of the threaded engagement of the spindle 21 with the threaded top portion 20, the upper leg portion 5 is gradually withdrawn upward into the support member 6. At this stage of trailer operation, the frame is assumed to be supported on the fifth wheel of the tractor or on the ground, and the wheels 1 are lifted off the traffic surface 12. The weight of the lower leg portion 3 and of the axle 2 and the wheels 1 causes the pin 4 to descend in the vertically elongated bore 11 of the upper leg portion 5 until the lower terminal portion 13 of the upper leg portion clears a wall of the recess 14, and the lower leg portion 3 is unlocked to rotate about the axis of the pin 4 in a counterclockwise direction, as viewed in FIG. 2.

Such counterclockwise rotation is induced by the abutting engagement of the boss 8 with the face 7 as the leg 3, 5 is further retracted into the support member 6. The irregular contour of the face 7 is shaped to provide contact with the boss 8 until the position illustrated in FIG. 3 is reached, in which the upper leg portion 5 is practically completely withdrawn into the cavity of the support member 6, and the wheels 1 are pivoted about the pin 4 so that their lowermost portion is on the same horizontal level as the lower terminal portion 13 of the upper leg member. It is readily seen from comparison of FIGS. 2 and 3 which are drawn to the same scale, that the increase of clearance under the frame 29 is very much greater than the corresponding stroke of the threaded top portion 20 of the upper leg portion. The pivotal connection of the two leg portions substantially reduces the overall height of the apparatus as compared to a conventional jack arrangement providing comparable road clearance.

The apparatus illustrated in FIGS. 1 to 3 is merely illustrative of this invention, and modifications thereof will readily suggest themselves to those skilled in the art.

Modified embodiments of the apparatus of FIGS. 1 to 3 which have been found particularly advantageous, are shown in FIGS. 4 and 5. The device shown in FIG. 4 in a position corresponding to that of the first described embodiment of the invention illustrated in FIG. 3 employ meshing gear segments 9, 10 on the support member 6 and the lower portion 3 as abutment means for actuating the pivoting movement of the lower portion 3. The apparatus is otherwise identical in structure and operation with that shown in FIGS. 1 to 3.

The embodiment of a support arrangement of the invention shown in FIG. 5 provides the lower leg portion 3' with a substantially cylindrical head 15 coaxial with the pin 4, and received in a conformingly shaped lower terminal portion 18 of a lower leg portion 5' which cooperates with a support member 6 in the manner illustrated in FIGS. 1 and 2.

In the extended position of the support arrangement illustrated in FIG. 5, clockwise rotation of the lower leg portion 3' on the pin 4 is prevented by abutment against an integral stop 18' on the terminal portion 18. The leg portion 3' is locked against counterclockwise rotation by a latch member 17 which is slidable into and out of a recess in the head 15. The recess is elongated transversely of the direction of elongation of the leg portion 3'. A spring 16 urges the latch member 17 outward of the recess. A pin 33 fixed in the head 15 and engaging an elongated slot 34 in the latch member 17 limits the movement of the latter. As shown in FIG. 5, the latch member 17 projects from the head 15 into abutting engagement with the upper leg portion, and thereby prevents counterclockwise rotation of the lower leg portion.

The outer end of the latch member 17 is beveled and aligned with a correspondingly beveled edge of a detent 19 which is fixedly fastened to the support member 6.

The device illustrated in FIG. 5 operates as follows:

When the leg 3', 5' is retracted into the support member 6 in the manner described in connection with the embodiment of the invention illustrated in FIGS. 1 to 3, the detent 19 engages the latch member 17 and forces it back into the recess of the head 15, thereby freeing the leg portion 3' for rotary movement in a counterclockwise direction. This movement is actuated by abutting engagement of the boss 8 on the support member 6 with a corresponding face 7 (not shown) on the leg member 3' in the afore-described manner.

When the wheels 1 of the several support arrangements illustrated are lowered, the sequence of events described above for the wheel lifting operation is reversed. The wheels first move pivotally downward under the force of gravity as the withdrawal of the boss 8 from the face 7 permits. When the pin 4 and the axle 2 are vertically aligned, the lower leg portion is locked in position.

In the embodiment of FIGS. 1 and 3, locking takes place automatically as soon as the weight of the trailer is transferred to the wheels, whereby the traffic surface exerts upward pressure on the wheel and forces the lower terminal portion 13 of the leg portion 5 into the recess 14 in the lower leg portion while the pin 4 moves vertically in the bore 11 within the limits set by the vertical dimensions of the bore.

In the device seen in FIG. 5, the latch member 17 is projected outward of the head 15 as soon as the outer end of the latch member clears the detent 19 independent of the application of load to the support arrangement.

The apparatus of the invention thus does not require any other action on the part of an operator than rotation of the crank handle 27. The wheels lock themselves automatically in the extended position, and are unlocked automatically when the leg is retracted. The wheel is secured in the upwardly pivoted position by suitably selecting the pitch of the threaded connection between the spindle 21 and the threaded top 20 so that the threads are self-arresting in a well known manner.

When the wheels are in their downwardly pivoted position, they may be safely loaded, and the trailer may be raised further from the position indicated in FIGS. 1, 2, and 5 by rotation of the crank handle 27. The vertical movement of the wheels is greater than the length of the support member 6. It is entirely practical therefore, to mount the support arrangement below the level of the trailer bed. The crank handle 27 may be mounted on any desired level, but the arrangement shown in FIGS. 1 and 2 wherein the handle axis is somewhat below the trailer frame is usually most convenient, and not readily available with conventional support arrangements.

A relatively small number of turns of the handle 27 raises or lowers the wheels 1 over the full height of their path. Since a large part of the effort involved in operating a screw jack of the type illustrated is consumed by the internal friction of the apparatus, the reduction in stroke possible with a screw jack operating the support arrangement of the invention results in a saving of overall energy input. This is favorable even where the jack is mechanically operated, and such mechanically operated jacks are entirely within the scope of this invention. The support arrangement of the invention inherently can be operated in a shorter time than similar devices now in common use for the same purpose.

Obviously, many modifications and variations of the present invention are possible in the light of the above teachings. It is therefore to be understood that within the scope of the appended claims, the invention may be practiced otherwise than as specifically described.

What I claim is:

1. A support arrangement for a vehicle comprising, in combination:
   (a) a fixed support member;
   (b) an upper leg member mounted on said support member for movement in a vertically extending direction;
   (c) a lower leg member mounted on said upper leg member for pivoting movement about a horizontally extending axis toward and away from an angular position in which said lower leg member extends downward from said upper leg member;
   (d) cooperating abutment means on said support member and on said lower leg member, said abutment means being horizontally spaced from said axis and engageable during upward movement of said leg member on said support member for pivoting said lower leg member away from said angular position thereof;
   (e) means for actuating movement of said upper leg member on said support member in said vertically extending direction; and
   (f) locking means responsive to downward movement of said upper leg member for locking said lower leg member in said angular position thereof.

2. An arrangement as set forth in claim 1, wherein said locking means includes a latch member simultaneously engageable with said leg members for locking said lower leg member in said angular position thereof, and resilient means permanently urging said latch member into simultaneous engagement with said leg members, said arrangement further comprising detent means responsive to upward movement of said upper leg member on said support member for disengaging said latch member from one of said leg members when said upper leg member moves past a predetermined position thereof on said support member.

3. An arrangement as set forth in claim 1, further comprising means for fastening said arrangement to a vehicle, and wheel means on said lower leg member.

4. A low-bed vehicle comprising a frame; a support member fixedly mounted on said frame; an upper leg member mounted on said support member for movement in a vertically extending direction; a lower leg member mounted on said upper leg member for pivoting movement about an axis extending in a horizontal direction toward and away from an angular position in which said lower leg member extends downward from said upper leg member; cooperating abutment means on said fixed member and on said lower leg member, said abutment means being horizontally spaced from said axis and engageable during upward movement of said leg member on said support member for pivoting said lower leg member away from said angular position thereof; locking means responsive to downward movement of said upper leg member for locking said lower leg member in said angular position thereof; and means for actuating said upward and downward movements of said upper leg member.

5. An arrangement as set forth in claim 1, wherein said support member and lower leg member constitute cooperating members, and said abutment means include boss means vertically projecting from one of said cooperating members toward the other cooperating member, and a contact face on the other cooperating member extending horizontally and engageable with said boss means.

6. An arrangement as set forth in claim 1, wherein said abutment means include gear means on said support member and on said lower leg member respectively, said gear means being meshingly engageable by said vertical movement of said upper leg member.

7. An arrangement as set forth in claim 1, wherein said leg members are movable over a limited vertical distance relative to each other when said lower leg member is in said angular position, and said locking means are responsive to relative movement of said leg members over said limited distance for locking said leg members in said predetermined relative angular position.

8. An arrangement as set forth in claim 7, wherein said locking means include a wedge shaped projection on one of said leg members, and wall means on the other leg member defining a conformingly wedge-shaped recess, said recess engaging said projection when said leg members move over said limited distance.

9. An arrangement as set forth in claim 1, wherein said locking means include a latch member on one of said leg members and spring means permanently urging said latch member into a position of locking engagement with the other leg member, and detent means on said support member engageable with said latch member for displacing the same from said position thereof against the urging of said spring means when said one leg member is vertically moved relative to said support member past a predetermined relative position of said one leg member and said support member.

10. An arrangement as set forth in claim 1, wherein said upper leg portion is secured against rotation relative to said support member, and said actuating means include an internally threaded member on said upper leg portion, spindle means threadedly engaging said threaded member, torsion tube means mounted on said support member and fixedly fastened to said spindle means, and means on said support member for rotating said torsion tube means.

11. An arrangement as set forth in claim 10, wherein said support member and said upper leg portion are tubular about the axis of rotation of said torsion tube means, and said spindle means is coaxially mounted in said torsion tube means.

12. An arrangement as set forth in claim 11, wherein said means for rotating said torsion tube means includes meshing gear means respectively fixedly mounted on said torsion tube means, and rotatable on said support member.

References Cited in the file of this patent

UNITED STATES PATENTS

| | | |
|---|---|---|
| 1,475,592 | Morrison | Nov. 27, 1923 |
| 1,475,598 | Ripsch | Nov. 27, 1923 |
| 1,783,822 | Bolard | Dec. 2, 1930 |
| 2,792,210 | Starr | May 14, 1957 |
| 2,959,395 | Strack et al. | Nov. 8, 1960 |